United States Patent Office 3,696,050
Patented Oct. 3, 1972

3,696,050
POLYMERIZATION INHIBITORS FOR VINYL MONOMERS AND UNSATURATED POLYESTERS
Arthur P. Werts III, and John E. Besser, Kingsport, Tenn., assignors to Eastman Kodak Company, Rochester, N.Y.
No Drawing. Filed Aug. 3, 1970, Ser. No. 60,638
Int. Cl. C08f 45/60
U.S. Cl. 252—403                                                3 Claims

ABSTRACT OF THE DISCLOSURE

Undesired polymerization of vinyl monomers, either in storage or while being processed, such as by distillation of the monomeric material, is prevented by adding to the monomer as a polymerization inhibitor small amounts of an N-substituted p-aminophenol, either alone or in combination with a phenol, substituted phenol, dihydric phenol, or substituted dihydric phenol, whereby a synergistic effect is realized. Preferably, the N-substituted p-aminophenol is either N-butyl p-aminophenol or N-cyclohexyl p-aminophenol. These inhibitors do not interfere in any way with subsequent processing of the stabilized monomer into the ultimate product.

---

This invention relates to the stabilization of vinyl monomers and unsaturated polyesters against undesired polymerization. More specifically, this invention relates to inhibiting polymerization of vinyl monomers and unsaturated polyesters while in storage, as well as while being processed to separate them in pure form from any undesired components which might otherwise remain in the material from the reactants employed in the original synthesis.

It is well known in the art that vinyl monomers and unsaturated polyesters are subject to polymerization during storage or transportation. Also, when the monomers are being distilled to separate them from undesirable impurities such as unreacted materials from which they are synthesized, there is a tendency for these monomers to polymerize. Polymerization at these times is undesirable and results in loss of the monomeric materials and great inconvenience. Polymers are, of course, valuable and useful materials for producing fibers, sheets, films, molded objects and the like. Polymerization must be carried out under controllable conditions at the right time. It has therefore been found necessary to add polymerization inhibitors or stabilizers to the monomeric material to prevent this undesired polymerization.

The terms "inhibitor" and "stabilizer" are used synonymously herein, as they are recognized in the art as meaning to inhibit the polymerization of polymerizable materials, or to stabilize inherently unstable materials. Typical materials which have been used in the past to inhibit polymerization of vinyl monomers and unsaturated polyesters include hydroquinone and monoalkyl ethers of hydroquinone, particularly hydroquinone monomethyl ether.

It is accordingly an object of this invention to provide a means of inhibiting undesired polymerization of vinyl monomers and unsaturated polyesters.

It is a further object of this invention to provide a means of inhibiting undesired polymerization in vinyl monomers and unsaturated polyesters during storage of the monomeric material and also during purification of the monomers.

Other objects and advantages will appear from the following detailed description of the invention.

In general, the present invention comprises inhibiting undesired polymerization in vinyl monomers and unsaturated polyesters by dispersing therein a small amount of an N-substituted p-aminophenol, either alone or in combination with a phenol, substituted phenol, dihydric phenol, or substituted dihydric phenol whereby a synergistic effect is realized. By treating the polymerizable material with this inhibitor, a high degree of stability is attained whereby the polymerizable material may be stored for long periods of time without deterioration or formation of polymeric material. Also, undesired polymerization is inhibited when the material is subjected to distillation to remove undesired components such as unreacted material employed in its synthesis, undesirable by-products resulting from side reactions, solvents and the like even at relatively high temperatures.

Typical vinyl monomers with which the inhibitors of the present invention are effective are the ethylenically unsaturated monomers containing at least one group of the structure $RC=CR$, where R is hydrogen, alkyl, halo, or aryl. Typical of these monomers are acrylic and methacrylic acids and their derivatives such as methacrylyl chloride, methyl methacrylate, ethyl acrylate, butyl acrylates, and other esters of these acids; vinyl hydrocarbons, such as styrene, vinyl acetate, acrylonitrile, methacrylonitrile, vinyltoluene, ethylstyrene, vinylnaphthalene, vinylanthracene, divinyl benzene and trivinylbenzene, and derivatives of vinyl alcohol. Among the vinyl monomers and unsaturated polyesters which the inhibitors according to this invention are particularly effective are styrene, methyl methacrylate, acrylonitrile and vinylidene chloride.

The inhibitors of the present invention are also effective for stabilizing unsaturated polyesters. These unsaturated polyesters are well known in the art, and their preparation and use are shown in the literature such as U.S. Patent No. 2,255,313. They are made by the esterification of unsaturated dicarboxylic acid, such as maleic or fumaric acids, with a dihydric alcohol such as ethylene glycol, propylene glycol, or 1,6-hexanediol. They can also contain one or more esterified dicarboxylic acids which are free of nonbenzenoid unsaturation, such as adipic, sebacic or phthalic acids. The inhibitors of this invention can also be used to stabilize mixtures of polymerizable materials such as mixtures of monomeric esters of acrylic and methacrylic acids.

The N-substituted p-aminophenols which are used as the inhibitor, or a part of the inhibitor of the present invention have the formula

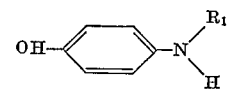

wherein $R_1$ is alkyl from $C_1$ to $C_{10}$ or phenyl. The term alkyl is intended to include cycloalkyl. Preferably, $R_1$ in the above formula is butyl or cyclohexyl, N-butyl p-aminophenol and N-cyclohexyl p-aminophenol are available commercially from Eastman Chemical Products, Incorporated.

As mentioned above, the N-subsituted p-aminophenol may be used alone or in combination with a phenol, substituted phenol, dihydric phenol, or substituted dihydric phenol of the general formula

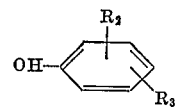

wherein $R_2$ is hydrogen, hydroxy, or alkyl from $C_1$ to $C_{10}$, and $R_3$ is hydrogen, hydroxy, alkyl from $C_1$ to $C_{10}$, or alkoxy from $C_1$ to $C_{10}$. Where the phenol is used with N-substituted p-aminophenol, a synergistic effect is surprisingly realized, as will be illustrated in the examples. Typical of the substituted phenols, dihydric phenols or substituted dihydric phenols are hydroquinone monomethyl ether, p-tert-butylcatechol, hydroquinone, monot-butylhydroquinone, toluhydroquinone, 2,5-di-t-amylhydroquinone.

The inhibitors comprising the N-substituted p-aminophenol and the phenol, substituted phenol, dihydric phenol, or the substituted dihydric phenol may be formed by physically mixing the two compounds. This may be accomplished by dissolving one component in the other if one is a liquid or by mixing the two components together in the monomer or in a solvent. The inhibitor can contain up to about 90% phenol, substituted phenol, dihydric phenol or substituted dihydric phenol, preferably about 0.8% to about 50% by weight of the total composition.

In general, only small amounts of the polymerization inhibitor are required to produce the desired degree of stabilization of the material. The actual amount employed will depend upon whether the inhibitor is added for the purpose of inhibiting polymerization during the purification or distillation process by which the monomer is produced or whether the inhibitor is employed to stabilize the preformed monomeric material while in storage. For example, if it is desired to protect the monomeric material against polymerization during distillation, the inhibitor may be added to the monomer in an amount corresponding to about 100 to about 100,000 parts per million of the monomer, by weight. On the other hand, if it is desired to protect a preformed pure monomer against polymerization in storage, the inhibitor may be added in an amount corresponding to about 10 to 10,000 and preferably 10 to about 200 parts of inhibitor to one million parts of monomer, by weight. Thus, depending upon the particular circumstances, the inhibitor may be present in the monomer in amounts ranging from about 10 to about 100,000 parts per million, by weight. Since most vinyl monomers are liquids at room temperatures, the inhibitor may be readily dispersed and dissolved therein by stirring, agitating, etc., at room temperature. The inhibitor may also be dissolved in a solvent which is neutral to the monomer and has no adverse effects upon the monomer.

To determine the effectiveness of any given inhibitor in preventing undesired polymerization of any given vinyl monomer, a sample of the monomer having dispersed or dissolved therein the desired amount of inhibitor can readily be subjected to standard stability tests which measure the amount of polymerization, if any, present in the material undergoing tests. Such tests are set forth in the following examples which clearly establish the effectiveness of prevention of polymerization by use of inhibitors of the present invention. These examples are therefore included for a better understanding of the invention.

EXAMPLE I

Styrene monomer containing 0.5% by weight of N-cyclohexyl-p-aminophenol (CHAP) is refluxed at 100° C. and 100 mm. mercury pressure under a nitrogen bleed. As Table I shows, after 8 hours reflux, the styrene contains about 0.25% polymer. Styrene inhibited with 0.1% p-tert-butylcatechol (TBC) is refluxed under the same conditions, and contains >1.0% polymer after 4 hours. A strong synergistic effect is obtained by inhibiting the styrene with 0.5% by weight CHAP and 0.005% by weight TBC; under the same reflux conditions as above, the styrene contains no polymer after 150 hours.

TABLE I

| Inhibitor | Inhibitor concentration, percent by wt. | Hours refluxed | Percent polymer |
|---|---|---|---|
| N-cyclohexyl-p-aminophenol (CHAP) | 0.5 | 8 | ca. 0.25 |
| p-Tert-butylcatechol (TBC) | 1.0 | 4 | >1.0 |
| CHAP Plus | 0.5 } | 150 | 0.0 |
| TBC | 0.005 } | | |

EXAMPLE II

Styrene monomer containing 1.0% by weight of N-butyl-p-aminophenol (BAP) is refluxed at 100° C. and 100 mm. of mercury pressure under a nitrogen bleed. As Table II shows, after 4 hours reflux, the styrene contains about 1.2% polymer. Styrene inhibited with 1.0% by weight p-tert-butylcatechol (TBC) is refluxed under the same conditions, and also contains over 1.0% by weight polymer. A strong synergistic effect is obtained by inhibiting the styrene with 0.22% BAP and 0.22% TBC; under the same reflux conditions as above, the styrene contains no polymer after 24 hours.

TABLE II

| Inhibitor | Inhibitor concentration, percent by wt. | Hours refluxed | Percent polymer |
|---|---|---|---|
| N-butyl-p-aminophenol (BAP) | 1.0 | 4 | ca. 1.2 |
| p-Tert-butylcatechol (TBC) | 1.0 | 4 | >1.0 |
| BAP Plus | 0.22 } | 24 | 0.0 |
| TBC | 0.22 } | | |

EXAMPLE III

Under the same reflux conditions outlined in Examples I and II, a synergistic effect is obtained by inhibiting the styrene with N-butyl-p-aminophenol (BAP) and hydroquinone monomethyl ether (HQMME). The effectiveness of this combination can be seen in Table III.

TABLE III

| Inhibitor | Inhibitor concentration, percent by wt. | Hours refluxed | Percent polymer |
|---|---|---|---|
| N-butyl-p-aminophenol (BAP) | 1.0 | 4 | ca. 1.2 |
| Hydroquinone monomethyl ether (HQMME) | 1.0 | 4 | >1.0 |
| BAP Plus | 0.16 } | 10 | 0.0 |
| HQMME | 0.12 } | | |

EXAMPLE IV

Methyl methacrylate monomer (MMA) containing 0.1% by weight N-butyl-p-aminophenol (BAP) is refluxed at atmospheric pressure for 96 hours; at the end of this time, the MMA contains 0.05% polymer as shown in Table IV. MMA inhibited with 0.002% hydroquinone (HQ) contains 0.035% polymer after only 2 hours reflux. A strong synergistic effect is obtained by inhibiting the MMA with 0.1% BAP and 0.002% HQ; after 96 hours reflux, this sample contains no polymer.

TABLE IV.—PERCENT POLYMER FORMATION IN METHYL METHACRYLATE AFTER REFLUXING

| Inhibitor | Inhibitor concentration, percent by wt. | Hours refluxed | | | | |
|---|---|---|---|---|---|---|
| | | 8 | 24 | 48 | 72 | 96 |
| BAP | 0.1 | 0 | 0 | 0 | .035 | .05 |
| BAP Plus | 0.1 } | 0 | 0 | 0 | 0 | 0 |
| HQ | 0.002 } | | | | | |
| CHAP | 0.1 | 0 | 0.035 | 0.035 | 0.04 | 0.05 |
| CHAP Plus | 0.1 } | 0 | 0 | 0 | 0 | 0 |
| HQ | 0.002 } | | | | | |
| HQ | 0.002 | | | [1] .035 | | |

[1] After 2 hours.

EXAMPLE V

MMA containing 0.1% by weight N-cyclohexyl-p-aminophenol (CHAP) is refluxed at atmospheric pressure for 96 hours; at the end of this time the MMA contains 0.05% polymer. As Table IV shows, a synergistic effect is obtained by inhibiting the MMA with 0.1% CHAP and 0.002% HQ; after 96 hours reflux, the samples contain no polymer.

The amount of polymer is determined by adding 1.0 ml. of the methyl methacrylate to 20.0 ml. of spectrograde methanol. This precipitates the polymer present and the polymer can then be filtered, dried, and weighed.

EXAMPLE VI

Acrylonitrile containing 0.5% by weight of N-butyl-p-aminophenol (BAP) is refluxed for 96 hours at atmospheric pressure. After this reflux period, 0.09% polymer is formed and precipitated from the monomer. Acrylonitrile containing 0.5% BAP in combination with 0.0045% hydroquinone monomethyl ether (HQMME) is refluxed under the same conditions for 96 hours; as Table V shows, only 0.01% polymer has formed and precipitated from the monomer. It is evident that a strong synergistic effect is obtained. Similar results are obtained by using 0.25% BAP and 0.0045% HQMME.

TABLE V

| Inhibitor | Inhibitor concentration, percent by wt. | Percent polymer after 96 hours reflux |
|---|---|---|
| N-butyl-p-aminophenol (BAP) | 0.50 | 0.09 |
| Hydroquinone monomethyl ether (HQMME) | 0.0045 | [1] 0.10 |
| BAP | 0.50 | |
| Plus | | 0.01 |
| HQMME | 0.0045 | |
| BAP | 0.25 | 0.08 |
| BAP | 0.25 | |
| Plus | | 0.01 |
| HQMME | 0.0045 | |

[1] After only 1 hour reflux.

EXAMPLE VII

A typical N-substituted p-aminophenol which can be used to prevent undesired polymerization of vinylidene chloride is N-butyl-p-aminophenol. The effectiveness of this compound is demonstrated in Table VI.

TABLE VI

Percent polymer in vinylidene chloride refluxed with various inhibitors for 96 hours Inhibitor (conc.=1%): Percent polymer (by wt.)
Hydroquinone monomethyl ether (control) __ 0.037
Phenol (control) _____ 0.090
N-butyl-p-aminophenol _____ 0.003

As this table shows, N-butyl-p-aminophenol is considerably more effective than either phenol or hydroquinone monomethyl ether in preventing polymerization of the vinylidene chloride monomer.

EXAMPLE VIII

Typical N-substituted p-aminophenols which can be used to prevent this undesirable polymerization are N-butyl-p-aminophenol and N-cyclohexyl-p-aminophenol. The effectiveness of these two compounds as inhibitors for acrylonitrile is demonstrated in the following table.

TABLE VII.—PERCENT POLYMER IN ACRYLONITRILE REFLUXED WITH VARIOUS INHIBITORS

| Inhibitor [1] | Hours refluxed | Percent polymer |
|---|---|---|
| Hydroquinone monomethyl ether (control) | 8 | 0.09 |
| Hydroquinone (control) | 58 | 0.12 |
| N-cyclohexyl-p-aminophenol | 58 | 0.06 |
| N-butyl-p-aminophenol | 58 | 0.07 |

[1] Inhibitor concentration=1% by weight.

As this table shows, the N-substituted p-aminophenols are considerably more effective than hydroquinone or hydroquinone monomethyl ether in preventing polymerization of the acrylonitrile monomer.

Unless otherwise indicated, the percentage, ratios and parts referred to above are by weight. Also, unless otherwise indicated, percentages of inhibitors referred to herein is based on the total weight of the compound, i.e., monomer plus inhibitor.

The invention has been described in considerable detail with particular reference to certain preferred embodiments thereof, but it will be understood that variations and modifications can be effected within the spirit and scope of the invention.

We claim:

1. A composition for inhibiting polymerization of vinyl monomers and unsaturated polyesters consisting essentially of an N-substituted p-aminophenol of the formula

wherein $R_1$ is alkyl of $C_1$ to $C_{10}$ or phenyl, and a phenol of the formula

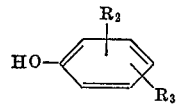

wherein $R_2$ is hydrogen, hydroxy, or alkyl from $C_1$ to $C_{10}$ and $R_3$ is hydrogen, hydroxy, alkyl from $C_1$ to $C_{10}$, or alkoxy from $C_1$ to $C_{10}$, said phenol being present from about 0.8% to about 50% by weight of the total composition.

2. A composition of matter according to claim 1 wherein the N-substituted p-aminophenol is N-butyl p-aminophenol and the phenol is p-tert-butyl-catechol.

3. A composition of matter according to claim 1 wherein the N-substituted p-aminophenol is N-cyclohexyl p-aminophenol and the phenol is p-tert-butyl-catechol.

References Cited

UNITED STATES PATENTS

| 3,265,659 | 8/1966 | Kobayashi | 252—403 |
| 3,466,248 | 9/1969 | Rosenwald | 252—404 |
| 2,908,558 | 10/1959 | Brimer | 252—403 |
| 2,865,723 | 12/1958 | Lappin et al. | 252—403 |

MAYER WEINBLATT, Primary Examiner

I. GLUCK, Assistant Examiner

U.S. Cl. X.R.

252—404; 260—75 N, 45.9 R, 45.95